E. STUBBS.
MICROMETER INDICATOR FOR TOOL FEEDING MECHANISMS.
APPLICATION FILED APR. 24, 1916.
1,263,142. Patented Apr. 16, 1918.
2 SHEETS—SHEET 2.
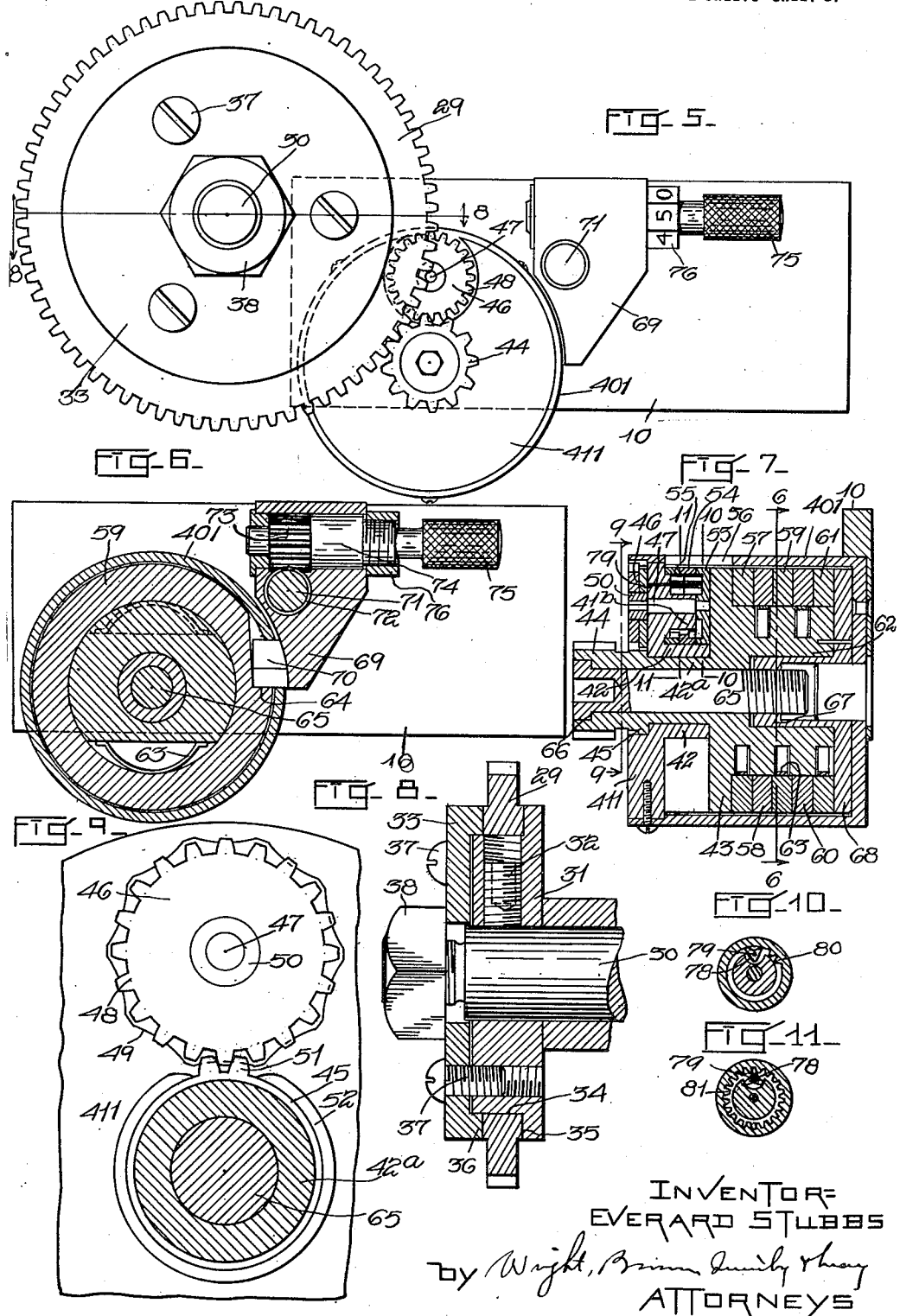
INVENTOR:
EVERARD STUBBS
by Wright, Brown, Quinby & Many
ATTORNEYS

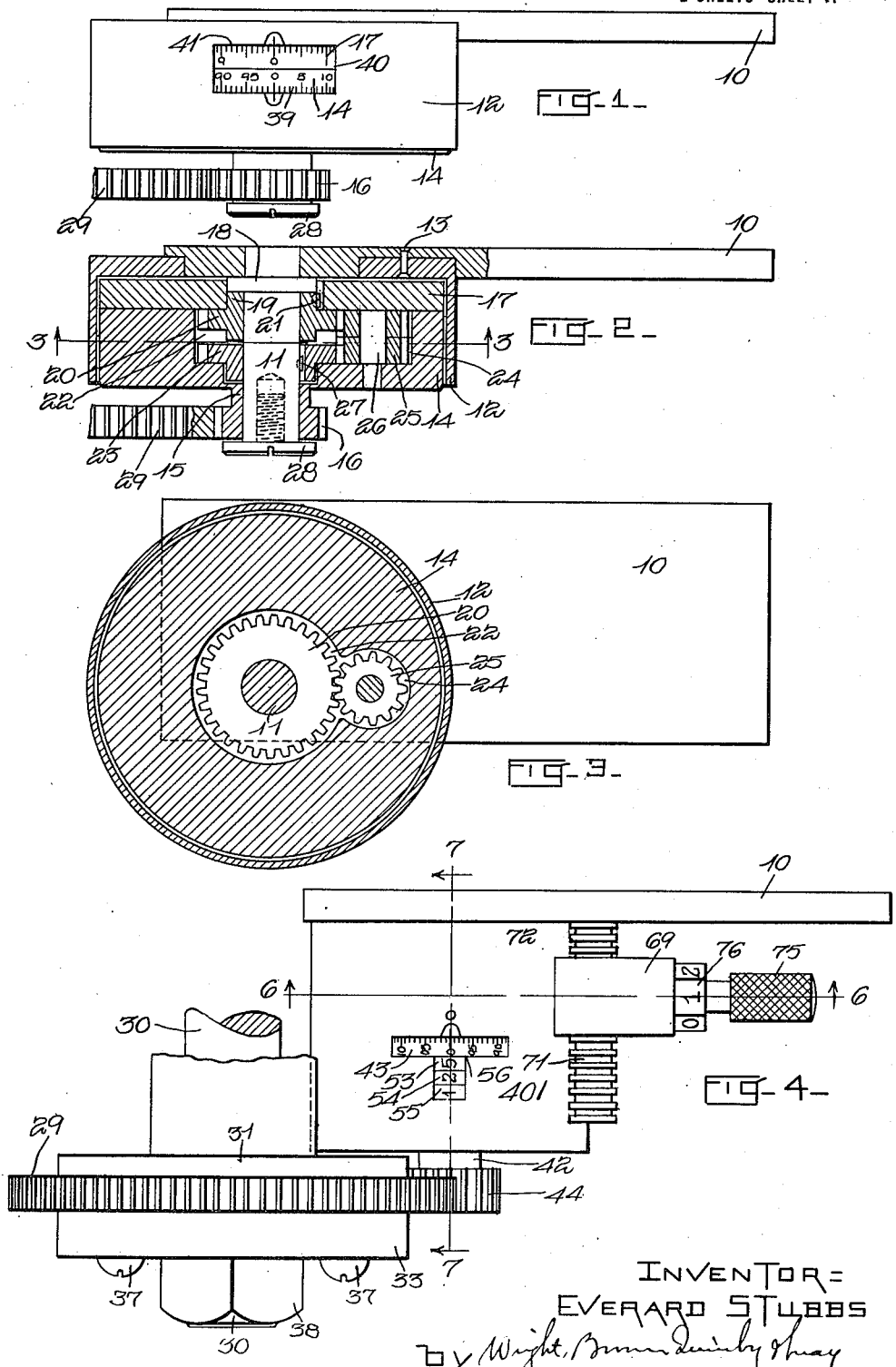

UNITED STATES PATENT OFFICE.

EVERARD STUBBS, OF SPRINGFIELD, VERMONT.

MICROMETER-INDICATOR FOR TOOL-FEEDING MECHANISMS.

1,263,142.  Specification of Letters Patent.  Patented Apr. 16, 1918.

Application filed April 24, 1916. Serial No. 93,044.

*To all whom it may concern:*

Be it known that I, EVERARD STUBBS, a subject of the King Great Britain, and resident of Springfield, in the county of Windsor and State of Vermont, have invented certain new and useful Improvements in Micrometer-Indicators for Tool-Feeding Mechanisms, of which the following is a specification.

The present invention relates to a micrometric indicating means adapted to be used for various purposes and in various combinations, among which may be named use in connection with the tool-holding means of machine tools, particularly engine lathes, etc. One special use which I have contemplated and for which I have designed the particular embodiments of the invention described and illustrated in this application, is in connection with the cross feed tool slide of an engine lathe for measuring accurately the exact position of a turning tool in relation to the axis of the lathe, and thereby the diameter of the work produced. This particular use and application of the invention is merely illustrative and the description of the same is not to be taken as a limitation of the invention thereto. Referring to this particular use, however, the embodiment of the invention adapted thereto is designed to be mounted upon the carriage of such a lathe, and to be geared to the screw which is ordinarily provided for operating the cross slide carrying the turning tool. The object of the invention and the result accomplished by it is to show in terms of minute subdivisions of the inch, or other unit of measurement, the exact location of the tool and the exact dimensions of the part of the work which is formed by the tool. More particularly the object is to show these dimensions by direct reading and to eliminate the necessity for mental calculation, or counting, in connection with the determination by the indicator of the size of the work.

A further object of the invention is to combine with the micrometer instrument above outlined a multiple stop for use when the lathe is employed for turning shouldered work and numbers of duplicate pieces are required to be made; and further to produce an improved multiple stop for this purpose.

Referring to the drawings,

Figure 1 is a plan view of one embodiment of the invention.

Fig. 2 is a horizontal sectional view of the same.

Fig. 3 is a vertical section on line 3—3 of Fig. 2.

Fig. 4 is a plan view of a modification of the invention containing essentially the same principles embodied in the previously mentioned form of the invention, but with additions and alterations in details.

Fig. 5 is a front elevation of the apparatus shown in Fig. 4.

Fig. 6 is a vertical section on line 6—6 of Figs. 4 and 7.

Fig. 7 is a central section on line 7—7 of Fig. 4.

Fig. 8 is a detail of the mechanism represented as a section on line 8—8 of Fig. 5.

Fig. 9 is a detail view on an enlarged scale representing a section on line 9—9 of Fig. 7 and showing in elevation the parts at the right of said line.

Figs. 10 and 11 are detail sectional views on lines 10—10 and 11—11 respectively of Fig. 7.

The same reference characters indicate the same parts in all the figures.

Referring first to the form of the invention shown in Figs. 1, 2, and 3, 10 represents a base or support, which is adapted to be secured upon the carriage of a lathe, or the movable tool-holding or work-holding parts of other machine tools. Fixed to this base plate is a forwardly projecting stud 11, and a cylindrical case 12 concentric with the stud, both the stud and case being rigid with the base plate and projecting forwardly therefrom. A rivet 13 is shown in Fig. 2 as representing a means for securing the case to the base plate.

A disk 14 is located within the case and is mounted rotatably on the stud 11 by means of a hub 15 to which is united a pinion 16; the latter being shown as integral with the hub, although it may be otherwise constructed, provided only it is in rigid connection with the disk. A second disk 17 is rotatably mounted on the stud beside the disk 14, having a bearing on an enlarged part, or collar, 18, of the stud and fitting also on the hub 19 of a gear 20, which is adapted to turn about the stud, and to which the disk 17 is keyed by a key 21. The central part of the disk 14 at the side next to the disk 17 is recessed to provide a cavity 22 in which is located the gear 20 above mentioned, and a second gear 23, and having also a recess or chamber 24 communicating with the recess 20 in which is contained a pinion 25 rotatably mounted on a stud 26 carried by the disk 14. Gear 23 is prevented from turning upon the stud 11 by a key 27. A screw 28 is set into the outer end of stud 11 and has a wide head which overlaps the gear 16 and retains the disk 14 on the stud.

The gear 16, and with it the disk 14, is adapted to be rotated by means of a large gear 29, which meshes with pinion 16 and is mounted upon the operating screw of the tool slide or other carriage or movable part of the machine tool with which my device is used. The mode of mounting gear 29 is shown in Figs. 4, 5, and 8 in connection with the form of the invention shown in the latter figures, substantially the same mode of mounting the gear being employed in both forms.

In the last-named figures, 30 represents the operating screw, 31 a disk which is placed upon the outer end of the screw and is secured thereon by set screw 32, and 33 a front plate or disk. The gear 29 is an annulus placed over a shoulder 34 of the disk 31 and pressed against a flange 35 of such disk by means of the peripheral rib 36 on the front plate 33, which flange surrounds the outer end of the shoulder 34. Take-up screws 37 pass through the front plate and are threaded into the disk 31 for tightening or loosening the grip with which the gear annulus is held. By loosening the screws 37, it is made possible to turn the operating screw 30 without operating the micrometer. A nut 38 screwed upon the end of the operating screw 30 retains the gear holder, by which term I include the disks 31 and 33, on the operating screw.

It will be appreciated that when the operating screw 30 is turned and the gear 29 is made fast thereto, the micrometric measuring disk 14 is turned proportionately. The periphery of this disk is provided with graduations 39 which appear through a window 40 in the case 12. These graduations represent thousandths of an inch and are numbered accordingly as shown. The disk 17 bears on its periphery graduations 41, which represent inches and tenths of an inch and are correspondingly numbered. The values above given are illustrative only, since it is obvious that the graduations may be in terms of other units of measurement than inches and other fractional parts than tenths and thousandths of the unit.

In the apparatus here shown it is intended that for each complete rotation of the disk 14, the disk 17 shall have turned through the distance representing one-tenth of an inch, and the gearing comprised by the gears 23, 25, and 20 is designed to transmit motion from the disk 14 to the disk 17 in this ratio. Gear 25 is a planetary pinion which is carried by the rotation of the disk 14 about the fixed gear 23 and rolls in mesh therewith, at the same time meshing with the gear 20. The teeth of the latter are spaced more or less closely than the teeth of gear 23 by the amount necessary for causing it to be advanced the distance above indicated during one revolution of the planetary pinion.

Figs. 4, 5, 6, 7, and 9 illustrate a modification of the hereinbefore described micrometer in which the readings are given more directly and in such a way as to require no mental calculation whatever. They also illustrate the combination with the micrometer of an adjustable multiple stop. In the form now to be described, the base plate 10, operating screw 30 and gear 29 mounted thereon are the same as in the form previously described. A casing or shell 401 is secured to the base plate and contains the counter elements or disks and the stops. Fixed to the casing 401 and closing the outer end thereof is a bearing plate 411 having a central bearing 42 in which is rotatably mounted the tubular hub or stem 42$^a$ of a micrometer disk 43. The end of said stem projects beyond the bearing plate 411 and carries or constitutes a pinion 44, which meshes with the gear 29. A disk 45 which is cut on the stem 42$^a$, or otherwise mounted thereon, coöperates with a complemental disk 46 fastened to a shaft 47 which passes through the bearing plate 411, and is rotatably supported therein. The disks 45 and 46 constitute one form of the well known Geneva stop motion and are shown in front view on an enlarged scale in Fig. 9. Disk 46 is constructed of two thin disks secured together, one of which is provided with peripheral teeth 48 and the other with a series of shallow rounded concave depressions 49. These two disks are securely mounted upon a bushing 50, which is fast upon the shaft 47. It is only for convenience of construction that the disk 46 is made in two parts as above stated, the essential feature of it being that the teeth 48 are in one plane perpendicular to the axis and the recesses 49 in a different but parallel plane. The disk 45 comprises two teeth 51 in the plane of the teeth 48 and a rib 52 in the plane of the depressions 49. The rib is cut away opposite the teeth 51. The mode of operation of such a stop motion is so well understood as to require no description. It is sufficient to say that for each rotation of the disk 45, the disk 46 is turned through the angle subtended by one of the recesses 49, and that when there are ten of such recesses, as here, disk 46 is turned through one-tenth of a turn. In other words, upon each rotation of disk 45, the disk 46 is turned through that part of one turn measured by the reciprocal of the number of recesses 49.

Shaft 47 passes through a number of counting wheels 53, 54, and 55, the former of which is fixed to said shaft, and the other two are adapted to turn on a boss 41ᵇ of the plate 411. The wheels 53, 54, and 55 constitute a counting mechanism of three places of which the right hand wheel is turned intermittently through one-tenth of a turn for every revolution of the disk 43, the wheel 54 is turned through one-tenth of a turn when the wheel 53 passes from the position indicating 9 to the zero position, and the wheel 55 is likewise turned through one-tenth of a turn whenever the wheel 54 passes from the point indicating 9 to the point indicating zero. The carrying mechanism for carrying tens from each right hand wheel to the next left hand wheel is shown clearly in Figs. 7, 10, and 11. In these figures, 78 represents two three-toothed carrying pinions mounted in a recess in one side of the boss 41ᵇ to turn about a pivot pin 79 fixed in the plate 411. Each of the carrying pinions extends partly across the rims of two of the counting disks and is adapted to be turned far enough when two teeth 80 on the right hand disk pass it, to move the left hand disk through one-tenth of a turn by acting upon a continuous series of teeth 81 on the latter, in a well known manner.

The counting wheels carry on their peripheries numbers reading from zero to 9, and the disk 43 carries one hundred graduations representing thousandths of an inch and numbers running in five unit intervals from zero to 95. The numbers and graduations on these wheels and on the disk, indicating the particular setting of the tool appear through a window or opening 56 in the casing.

It will be apparent from the foregoing that the disk 43 measures adjustment of the tool in terms of thousandths of an inch, the wheel 53 measures tenths of inches, the wheel 54 measures inches and the wheel 55 tens of inches. One revolution of the disk 43 measures one-tenth of an inch, and upon its completion the wheel 53 is turned by the stop motion mechanism above described, to record the completion of a revolution.

It will be observed from Fig. 4 that the numbers exhibited by the counting wheel and the micrometer disk are in line in the same manner that the digits of a written number are placed in line, whereby the dimensions indicated by the instrument may be read at a glance with accuracy and without need of any mental calculation whatever. The indication shown in Fig. 4 is 12.500 inches, which is exhibited in the manner in which it is written, and other indications are exhibited in the same manner.

Where the instrument is used on a lathe in turning work, I prefer to gear the micrometer disk so as to indicate twice the distance of travel of the turning tool, whereby to read in terms of the diameter of the work rather than of the distance of the tool from the rotating axis of the lathe.

It is not to be assumed from the foregoing description that I limit the invention to that form of instrument which reads according to the decimal system, or in inches rather than in other units of measurement, or in any respect as to the fractional parts of the chosen unit in the terms of which its indications are read. Neither do I limit the invention to a form adapted for turning lathes, or the application thereof to a lathe or other machine in which the movement of the tool is measured, or to one in which the measured movement is produced by a screw rather than by other means. I include within the scope of the invention contrivances, or instruments, adapted to be used with all sorts of machine tools and machines for measuring movements of parts thereof, whether such parts are the working tools, or other parts, or other elements, of the machine, and regardless of the manner in which movement is transmitted to the measuring instrument.

In connection with such instrument as I have described, it is desirable for many uses to provide a plurality of stops in order that the movement of the tool may be arrested at different given points when acting upon parts of a work piece having different diameters. For this purpose I have provided, as shown in Figs. 6 and 7, a number of rings 57, 58, 59, 60, and 61, which are rotatably mounted side by side upon an extension 62 of the disk 43. This extension has notches or recesses in the planes of the several stop rings, alternate recesses being at opposite sides of the extensions in order to avoid making a single large open space, and in each of these recesses is located a bowed spring 63 bearing on the inner periphery of the adjacent stop ring, as indicated in Fig. 7 and better shown in Fig. 6. The stop rings are freely rotatable upon the extension 62 for the purpose of adjustment, their rotation being frictionally resisted by the springs 63. Such rotation permits the stop shoulder 64 of any stop ring to be placed at any desired point with respect to the disk 43. The adjustment of the several stop rings is made permanent by means of a screw 65, passing through the tubular stem 42ᵃ of the disk 43 and having a head 66, which bears against a shoulder in said stem. This screw is threaded through the inwardly offset central part 67 of a clamp disk 68, which overlies the endmost stop ring 61. By means of the screw 65 this clamp disk is caused to press the stop rings against one another and against the actuator disk 43, with sufficient force to hold them by friction immovable with respect to the disk.

Coöperating with the shoulders 64 of the several rings is a stop pawl 69 having a toe 70, which passes through a slot in the side of the casing 40 and is adapted to be engaged with the stop shoulder of any one of the stop rings. Said pawl is supported upon a stud shaft 71 so that it may turn about the same and also be moved longitudinally thereof to engage with and be disengaged from any one of the stop rings. The stud 71 has ribs 72 with intermediate grooves, and coöperating therewith is a pinion 73 on a shaft 74 which is rotatably mounted in the pawl 69, and is provided with a head 75 for manually rotating it. Said shaft carries an indicator 76, here shown as a nut with numbers on its different faces, for showing the position of the pawl and indicating which one of the stop rings it is adapted to engage with. Each one of the stop rings is adapted to be set with relation to the indicator disk and counting wheels, and when so set, and used in coöperation with the stop pawl, as described, insures uniformity in the production of duplicate pieces having parts with different diameters.

The manner of use of the pawl is as follows. When not in use, it is turned about the stud 71 far enough to withdraw its toe from engagement with the shoulder 64 of any of the stop rings. It is brought into use by being placed in the plane of a selected ring, and left free so that its toe bears by gravity on the circumference of the ring. When the feed screw is turned to feed the tool, the stop ring is likewise turned, as previously described, until the shoulder thereon reaches the pawl. The notch formed in the ring in front of the shoulder as shown, allows the toe of the pawl to drop into the path of the shoulder which, striking such toe, arrests the ring, the micrometer disk whereon it is mounted, and the feed screw geared thereto, whereby the entire tool slide or carriage is arrested.

What I claim and desire to secure by Letters Patent is:

1. A micrometric instrument for measuring the movement of movable machine parts, comprising a base adapted to be attached to a machine, a graduated micrometer element rotatably carried by said base, a driving element associated with said micrometer element for imparting rotation thereto, adapted to be driven by a movable machine part, a counter rotatably mounted on said base, having markings arranged to show the number of rotations of said micrometer element, and gearing between said micrometer element and said counter for imparting to the latter a given angular movement with each rotation of the former.

2. In combination with a rotatable operating element for feeding a movable part of a machine, a micrometer instrument adapted to be mounted on such movable part, and having a rotatable graduated member indicating fractions of the unit of length, means whereby rotation of the operating element rotates said graduated member, and means located beside said graduated member and geared to it for indicating the number of complete rotations made by said graduated member.

3. A micrometer apparatus adapted to be mounted upon a movable part of a machine tool, including a rotatable distance indicator, means for counting the number of whole revolutions of said indicator having a direct and normally unchangeable geared connection with the latter, an actuator for moving said machine part, and means for transmitting rotation to said indicator from said actuator, in degrees proportional to the extent of motion given to the movable machine part by the actuator.

4. In combination with the tool-slide operating screw of a lathe, a micrometer adapted to be mounted on the carriage whereon such slide is mounted, and including a graduated, rotatable, indicating disk, intermeshing gears connected to said screw and disk respectively, for turning the latter proportionately to angular movements of the former, and counting means mechanically actuated by the disk for showing the number of complete rotations of the disk.

5. In combination with the tool-slide operating screw of a lathe, a micrometer adapted to be mounted on the carriage whereon such slide is mounted, and including a graduated, rotatable, indicating disk, intermeshing gears connected to said screw and disk respectively, for turning the latter proportionately to angular movements of the former, and counting means for showing the number of complete rotations of the disk, said disk and counting means being arranged with their indications side by side for direct reading.

6. A micrometer instrument for measuring the movement of movable machine parts, comprising a base or frame adapted to be mounted on the part of which the movement is to be measured, a graduated indicating disk rotatably mounted on said frame, means for rotating said disk, a numbered counting wheel mounted beside said disk, and means whereby said disk causes the counting wheel to be turned through a fractional part of a rotation for each complete rotation of the disk.

7. A micrometer instrument for measuring the movement of movable machine parts, comprising a base or frame adapted to be mounted on the part of which the movement is to be measured, a graduated indicating disk rotatably mounted on said frame, means for rotating said disk, a numbered counting wheel mounted beside said disk, and means whereby said disk causes the counting wheel to be turned through a fractional part of a rotation for each complete rotation of the disk.

8. A micrometer instrument for measuring the movement of movable machine parts, comprising a base or frame adapted to be mounted on the part of which the movement is to be measured, a graduated indicating disk rotatably mounted on said frame, means for rotating said disk, a series of numbered counting wheels mounted beside said disk and beside one another in such manner that the numbers on said wheels at the reading point thereof are alined in the same way that the digits of a written number are alined, and transmitting mechanism for imparting counting movements from the disk to the wheels.

9. A micrometic indicator comprising a rotatable indicating element, a plurality of stop shoulders associated with said element and spaced longitudinally of the axis thereof and also angularly about said axis, a supporting stud arranged substantially parallel to the axis of said indicating element, and having ribs, a complemental stop pawl mounted on said stud to move freely thereon both longitudinally and rotatably, and an adjusting pinion carried by said pawl meshing with the ribs of said stud and adapted to be rotated for shifting the pawl along the stud into position for co-action with any one of said stop shoulders.

10. A micrometric indicator comprising a rotatable indicating element, a plurality of stop shoulders associated with said element and spaced longitudinally of the axis thereof and also angularly about said axis, a supporting stud arranged substantially parallel to the axis of said indicating element, and having ribs, a complemental stop pawl mounted on said stud to move freely thereon both longitudinally and rotatably, and an adjusting pinion carried by said pawl meshing with the ribs of said stud and adapted to be rotated for shifting the pawl along the stud into position for co-action with any one of said stop shoulders, and an indicator connected with said pinion for indicating the relation of the pawl to the stop shoulders.

In testimony whereof I have affixed my signature.

EVERARD STUBBS.

Witnesses:
IRVING EVANS,
RALPH D. KLEBES.